United States Patent
Martin et al.

(10) Patent No.: US 6,741,855 B1
(45) Date of Patent: May 25, 2004

(54) METHOD AND APPARATUS FOR REMOTELY MANAGING DATA VIA A MOBILE DEVICE

(75) Inventors: Guy W. Martin, San Jose, CA (US); Owen M. Densmore, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/535,911

(22) Filed: Mar. 24, 2000

(51) Int. Cl.[7] ................................................. H04M 3/00
(52) U.S. Cl. .................... 455/419; 455/412.1; 455/556.2
(58) Field of Search ................................. 455/418, 419, 455/420, 414.1, 426.1, 433, 445, 458, 466, 552.1, 556.2, 557, 412.1, 412.2, 413; 709/206, 217, 219

(56) References Cited

U.S. PATENT DOCUMENTS

| | | | |
|---|---|---|---|
| 5,745,532 A | * 4/1998 | Campana, Jr. | 375/347 |
| 5,845,203 A | * 12/1998 | LaDue | 455/414.1 |
| 6,219,694 B1 | * 4/2001 | Lazaridis et al. | 709/206 |
| 6,405,175 B1 | * 6/2002 | Ng | 296/97.9 |

FOREIGN PATENT DOCUMENTS

| EP | 0981232 A2 | 2/2000 |
|---|---|---|
| EP | 0987868 A2 | 3/2000 |
| EP | 1026859 A1 | 8/2000 |
| WO | WO 00/13380 | 3/2000 |

OTHER PUBLICATIONS

"Mail Server Pro Server Only", Sambar Server Documentation, 'Online! 1999, XP002207089, Retrieved form the Internet: URL:http://sambar.pollie.nl/mail.htm>, retrieved on Jul. 22, 2002 Whole document.

T. MacGrath: "Use DNS and UNIX Relay Hosts to Route Messages to Exchange Server", Exchange and Outlook, 'Online! XP002207090, Retrieved form the Internet: URL:http//www.exchangeadmin.com/Articles/Index.cfm?ArticleID–6016>, retrieved on Jul. 22, 2002 Whole document.

* cited by examiner

Primary Examiner—Edward F. Urban
Assistant Examiner—Thuan T. Nguyen
(74) Attorney, Agent, or Firm—Gunnison, McKay & Hodgson, L.L.P.; Philip J. McKay

(57) ABSTRACT

One embodiment of the invention provides a method and apparatus for remotely managing data in a network system comprising at least one mobile device (e.g. a PDA, cellular phone, two-way pager, or mobile computer) and a least one server computer connected via an interconnection fabric, wherein the mobile device is registered with the server and configured to issue commands to a bot service using electronic mail messages or some other viable data transmission mechanism. The bot service responds to the commands by interfacing with the server computer to perform the requested action on behalf of the mobile device.

13 Claims, 5 Drawing Sheets

METHOD AND APPARATUS FOR REMOTELY MANAGING DATA VIA A MOBILE DEVICE

BACKGROUND OF THE INVENTION

1. Field of the Invention

This invention relates to the field of computer software. More specifically, the invention relates to remotely managing data stored on a networked device via another networked device.

2. Background Art

Server devices, such as data processing and computing systems, typically maintain data and information for access by mobile devices. An increasing number of such mobile devices are configured to interact with and/or obtain data from a server computer via a communication link such as a computer network. Such mobile devices may comprise client computers, Personal Desktop Assistants (PDAs), two-way pagers, and cellular phones. A problem with current mobile devices is that such devices do not provide an efficient method for accessing and managing data maintained in server computers. For example, current mobile devices typically require modification in order for the device to properly communicate with the server.

An existing method for alleviating such problems has been to provide a gateway for each specific type of mobile device using a private communication protocol between the mobile device and the server computer. The gateway is configured to provide users of such mobile devices the ability to access and manage information maintained on the server (e.g., email messages). However such a private protocol is specific to each mobile device, requiring each mobile device to be specifically modified and/or configured to use such a protocol. The server must further include the capability for using a specific/different protocol to communicate with different types of mobile devices. Such methods are inefficient, expensive, and time consuming to implement.

There is therefore a need for an efficient method and system for remotely managing and/or accessing information stored on a networked device via another networked device.

SUMMARY OF THE INVENTION

The present invention satisfies these needs by providing mobile devices users with a way to control the type of information supplied to the device by one or more server computers. In an embodiment of the invention, users may accomplish this by transmitting a command message to a bot service which works on behalf of the user and directs the server to respond to the action specified in the command message. The command message provides users with a way to uniformly manage and/or control data residing on the server computer from different types of mobile devices.

One embodiment of the invention provides a method and apparatus for managing data in a network system comprising at least one mobile device (e.g. a PDA, cellular phone, two-way pager, or mobile computer) and at least one server computer connected via an interconnection fabric, wherein the mobile device is registered with the server and configured to issue commands to a bot service using electronic mail messages or some other viable data transmission mechanism. The bot service responds to the commands by interfacing with the server computer to perform the requested action on behalf of the mobile device.

An aspect of the invention provides mobile devices with a mechanism for performing remote operations on an associated service such as an electronic mail queue and/or calendar. Each associated service resides on a server and has a state which may be set by issuing a command message to the bot service. The bot service responds to the command message by instigating the remote operation which in turn causes an action to occur (e.g. it may change the state of an associated service). Such operations may be performed from multiple locations, using different mobile devices, at different periods of time. Each mobile device may interface with the bot service using electronic mail software.

To begin using the system, a mobile device is registered with the bot service. The bot service is configured to interface with the server computer and cause commands to execute on behalf of the user of the mobile. In one embodiment of the invention, command messages are issued to the bot service by transmitting an email message to an address associated with bot service. For example, after registering a mobile device with the bot service, a user of the mobile device may transmit a command message to a network address associated with the bot service (e.g.bot@company.com). The command message specifies one or more actions that are to be performed on behalf of the device. The command message may, for example, direct the server to retrieve, forward, delete, and/or move electronic mail messages. The invention also contemplates other actions such as generating a new message, looking up calendar events, inserting a new event, querying a database, or any other type of action that may be performed on the server and generate a result that is to be displayed on a mobile device. The command message may be transmitted via email or by any other service capable of providing a command message to the bot service.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for managing information via a mobile device. In the following description, numerous specific details are set forth to provide a thorough description of embodiments of the invention. It is apparent, however, to one skilled in the art, that the invention may be practiced without these specific details. In other instances, well known features have not been described in detail so as not to obscure the invention.

Generalized Overview

One embodiment of the invention provides a method and apparatus for managing data in a network system comprising at least one mobile device (e.g. a PDA, cellular phone, two-way pager, or mobile computer) and at least one server computer connected via an interconnection fabric, wherein the mobile device is registered with the server and configured to issue commands to a bot service using electronic mail messages or some other viable data transmission mechanism. The bot service responds to the commands by interfacing with the server computer to perform the requested action on behalf of mobile device.

An aspect of the invention provides mobile devices with a mechanism for performing remote operations on an associated service such as an electronic mail queue and/or calendar. Each associated service resides on a server and has a state which may be modified or set by issuing a command message to the bot service. The bot service responds to the command message by instigating the remote operation which in turn causes an action to occur (e.g. it may change the state of the associated service or send data back to the mobile device). Such operations may be performed from multiple locations, using different mobile devices, at different periods of time.

To begin using the system, a mobile device is registered with the bot service. The bot service is configured to interface with the server computer and cause commands to execute on behalf of the user of each mobile device. In one embodiment of the invention, command messages are issued to the bot service by transmitting an email message to an address associated with the bot service. For example, after registering a mobile device with the bot service, a user of each mobile device may transmit a command message to a network address associated with the bot service (e.g. bot@company.com). The command message specifies the action that is to be performed on behalf of the device. The command message may, for example, direct the server to retrieve, forward, delete, and/or move electronic mail messages. The invention also contemplates other actions such as generating a new message, looking up calendar events, inserting a new event, querying a database, or any other type of action that may be performed on the server and generate a result that is to be displayed on a mobile device. The command message may be transmitted via email or by any other service capable of providing a command message to the bot service.

Example System

Figure 1:
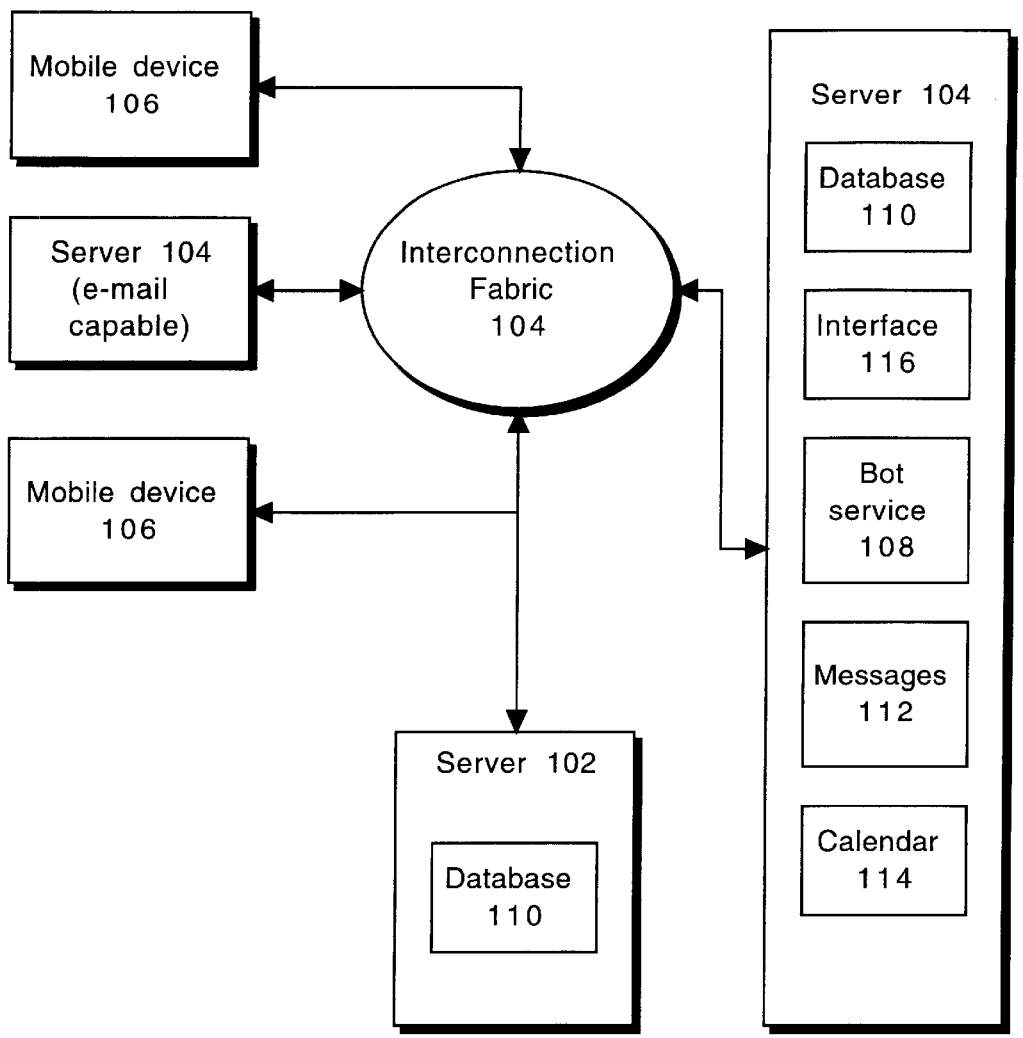
FIG. 1 shows a block diagram of a network system in which an embodiment of the present invention can be implemented.

FIG. 1 is a block diagram of system 100 in which an embodiment of the present invention can be implemented. System 100 comprises one or computing systems (e.g., server computers) 104 and 102 interconnected to an interconnection fabric 105. In an embodiment of the invention, interconnection fabric 105 comprises any of multiple suitable communication paths for carrying data between one or more mobile devices 106 and server 104 and/or 102. The interconnect fabric may be, for example, a local area network implemented as an Ethernet network. Any other local network may also be utilized. The invention also contemplates the use of wide area networks, the Internet, the World Wide Web, and other such networks. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between mobile device and bot service 108. One embodiment contemplates a single-level, switched network, with cooperative (as opposed to competing) network traffic. Dedicated or shared communication interconnects may be used in the present invention.

The system 100 further comprises one or more mobile devices 106 than can be interconnected to servers 104 or 102 via communication links to network 105. For example, a mobile device may use a modem or other such mechanism to connection to server 104. Mobile devices utilized by one embodiment of the invention are configured to send and receive electronic mail data. For example, if mobile device 106 is a pager, the pager is configured to send and receive alphanumeric data. Server 104 is a computer configured to process electronic mail data. For example, server 104 may accept and store electronic mail data in mailbox associated with a particular user. Server 104 may be, for example, configured to support IMAP (Internet Message Access Protocol).

IMAP provides a method for accessing electronic mail and/or bulletin messages that reside on server 104. The IMAP protocol comprises operations for creating, deleting, renaming mailboxes, checking for new messages, permanently removing messages, setting and clearing flags, server based parsing, searching, and selective fetching of message attributes, texts, or portions thereof. Thus, IMAP permits a mobile email program on a mobile device (e.g. a mobile computer) to access remote message stores as if the messages were stored on the device itself (e.g. in a location independent manner).

In one embodiment of the invention server 104, comprises database 110, user interface 116, bot service 108, messages 112, and calendar 114. Mobile device 106 may, for example, communicate with bot service 108 to obtain access to and/or modify messages 112, calendar 114, or database 110.

Example Method for Managing Data via a Mobile Device

Figure 2:
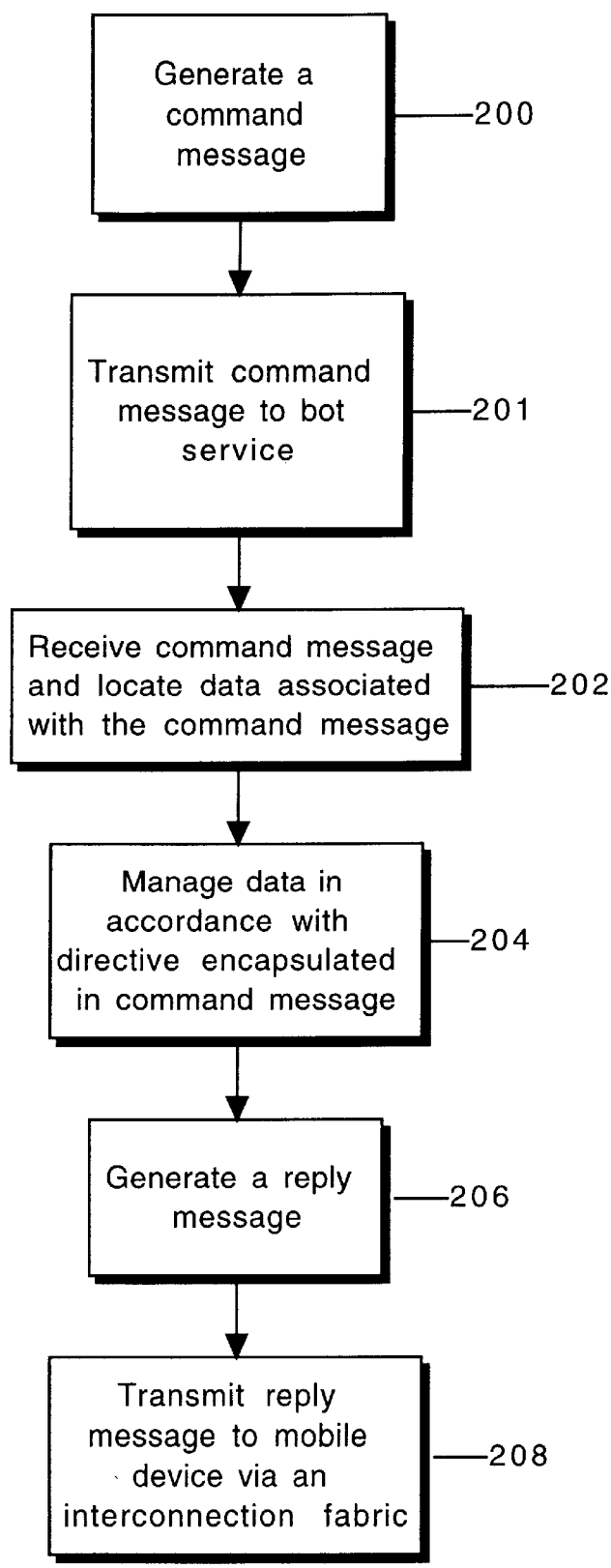
FIG. 2 shows a flow diagram that illustrates how an embodiment of the invention performs the method of managing information resident on a server computer from a mobile device.

Referring now to FIG. 2, a flow diagram that illustrates a method for managing data that resides on a server computer 104 from mobile device 106 is shown. The method initiates at step 200, where a command message is generated by a mobile device 106. The command message comprises information utilized to identify and manage data that resides on server 104. Once the message is formulated it is transmitted to bot service 108 (step) 201 which in turn causes the command to execute on 104 (step 202). In one embodiment of the invention, command messages adhere to a generalized syntax that may be utilized by multiple types of mobile devices. In other embodiments of the invention, different types of mobile devices each support a unique syntax. Bot service 108 is configured to understand multiple types of commands and is capable of translating such commands into actions to be performed by the server.

When the command message is transmitted to bot service 108, step 202 executes. The command message may be encapsulated inside an electronic mail message or any other type of data product. At step 202, bot service 108 receives the command message and locates data associated with the command message. For example, if the command message directs the bot service 108 to obtain the last 25 electronic mail documents that reside on server 104 and that are associated with the mobile device 106 that submitted the command message, bot service 108 will execute the command at server 104 on behalf of the user who submitted the command. At step 204, the data associated with the command message is managed in accordance with the directive in the command message.

In one embodiment of the invention, the method further comprises generating an reply message at server 104, the reply message comprises information related to the data that resides on server 104 (e.g. step 206). Once the message is generated it may be transmitted to the mobile device 106 (step 207) for processing. The reply message is received at the mobile device at step 208 and processed and/or rendered for display. The reply message may be formulated as an email message and may comprise a menu of command alternatives. The reply message may also comprise data requested in the command message.

An embodiment of the invention contemplates the use of mobile devices (e.g. mobile device 106) that have an email interface. The method illustrated in FIG. 2 may be implemented as a remote data retrieval and/or modification service (e.g. bot service 108). Such a method may, for example, provide a mechanism for enabling users to manage mail on existing email capable servers via a mobile device having an associated email address (e.g. PDAs, two-way pagers, cellular phones, etc.). Mobile device 106 may use the invention to retrieve and remotely control data maintained network system 100 (e.g. on server 104 or server 102).

In an embodiment of the invention, bot service 108 comprises a Java server implemented utilizing Java Servlet technology, having an Application Programming Interface (API), for receiving remote commands via command messages from mobile devices 106. Bot service 108 is configured to manage data maintained in an email server capable server such as server 104 (or data maintained in other servers, storage devices, computing systems, etc. connected to that server with bot service 108). In one aspect of the invention, bot service 108 maintains a database 110 comprising information about each user and information about the corresponding mobile device 106 associated with that user. The database, for example, may contain an email address that can be utilized to transmit data to mobile device 106. The information maintained in database 110 (e.g. email address associated with a mobile device) is typically obtained from users during a registration process, however, such information may be obtained at other times and later modified by the user. During the registration process the user provides a user profile that comprises information about the user and mobile device(s) associated with that user. Database 110 further comprises information about data maintained in server 104 (e.g., messages intended for each user, calendar information for each user, etc.). The data may be accessed and manipulated by issuing command messages from mobile device 106.

Mobile device 106 can comprise a PDA having a wireless communication interface, wherein a user can send/receive command messages to a specific email address associated with server 104 (e.g. bot@company.com). The email address provides an interface for transmitting commands and receiving data. The command message comprises identification information for data in server 104 and, one or more commands for managing the data resident on server 104 or any other server configured to accept command directives from bot service 108. Upon receiving the command message from mobile device 106, bot service 108 recognizes the email address associated with mobile device from which the command was transmitted, obtains the email address from database 110, and locates the information maintained in server 104 for the user identified in the command message received from mobile device 106. Bot service 108 then modifies, provides, and/or manages the identified data in a manner that complies with the directive encapsulated in the command message. For example, bot service 108 may generate and transmit a responsive email message addressed to mobile device 106 that comprises information related to the identified data and/or command execution.

An embodiment of the invention, for example, provides users a way to manage (e.g., view summaries, read, respond, delete, forward, move, etc.) messages 112 sent from other users in network system 100 intended for the user and maintained at server 104's (e.g., corporate server) mail repository. The user manages messages 112 via mobile device 106 using the email interface contained on mobile device 106. If, for example, the user wishes to manage messages 112, the user may do so by transmitting a command message to bot service 108 that directs server 104 to provide a summary of messages 122. The command message may be formulated as part of an electronic mail document.

The user may send the command message to a specific address associated with bot service 108. Upon receipt of the command message, bot service 108 accesses database 110 to determine the email address associated with the sender of the command message (i.e., the email address of mobile device). The address information is utilized, for example, to locate messages 112 that are maintained on server 104. In accordance with one aspect of the invention, bot service 108 generates a reply message comprising the information requested in the command message. Bot service 108 may, for example, generate a reply message addressed to the address associated with mobile device 106, that comprises a summary of messages 112. Upon completion of the requested task, bot service 108 transmits the reply message (e.g. via email) to mobile device which in turn displays the result to the user.

The user can then review the summary of messages contained in the reply message, select one or more of the messages for detailed review, and generate and transmit a second command message from mobile device 106 to the specific address at server 104, wherein the second command message identifies the selected messages and comprises commands for bot service 108 to provide full text of the selected messages 112 to the user at mobile device 106.

Upon receiving the second command message, bot service 108 recognizes the address (e.g. the email address) of mobile device 106 as the sender of the second command message, and utilizes the information in the second command message to locate the selected messages in server 104 and, example, either provide the text of the selected messages in a second reply message to mobile device 106, or forward the selected messages to mobile device 106 as independent email messages.

In one embodiment of the invention, the user can establish an email address at server 104 for receiving messages 112 from other users and/or other devices in network system 100. Messages sent to the user from other users are maintained in a mail queue for that user. The user can utilize a mobile device 106 to command bot service 108 to manage the user's message queue in the server 104 (or elsewhere in network system 100). The user can also provide text and command bot service 108 to send the text as a message to another user from server 104 using the user's email address at server 104, rather than the user sending a message to another user directly from the user's device 106 (e.g., the user can keep his/her mobile device email address private).

The invention contemplates the use any mobile device that is registered with the system. For example, a user can use two or more mobile devices 106, each having a unique email address, to communicate with bot service 108 for managing the user's email queue at server 104. Because the user can utilize multiple mobile devices 106 to manage his/her email queue, rather than directly sending messages to other users from each of individual mobile device 106, the user need only be concerned with managing the one message queue, rather than a message queue for each of mobile devices 106 for messaging with other users. The message queue may reside in server 104, or any other server configured to interface with bot service 108.

In accordance with an embodiment of the invention, mobile device 106 comprises an email interface for sending email messages to bot service 108 (which may be on server 104 or any other server connected to the network) and for receiving email messages from server 104. As the above example illustrates, the user utilizes the command API of bot service 108 to generate and transmit email messages from mobile device 106 to server 104, wherein the email messages comprises commands for bot service 108 to manage information in server 104. Bot service 108 then executes the commands and provides responsive information to the user via email messages transmitted from the server 104 to mobile device 106.

In an embodiment of the invention, bot service 108 comprises a command interpreter for receiving commands encapsulated in an email messages from mobile device 106, and executing each recognized command. For example, upon receipt of a command message bot service 108 extracts the command from the message by separating the command data from the header information and other data transmitted in the email. Bot service 108 can parse multiple command sets for managing different types of data maintained in server 104. A single command message may, for example, contain multiple commands. Bot service 108 is configured to determine which portions of the command message contains actual commands.

Because the email interface in mobile device 106 is used to communicate with bot service 108, mobile device 106 need not be modified. If mobile device 106 does not already include a mechanism for secure communication, and one is desired, a secure communication software/hardware module can be included in mobile device 106 for secure email communication with server computer 104.

The user can also utilize bot service 108 to maintain user's calendar/scheduling information 114. The user may, for example, utilize mobile device 106 according to the above method to command bot service 108 to manage the user's calendar information 114 (e.g., schedule an appointment, cancel an appointment, include reminders, receive different views of the calendar such as weekly or daily views, etc.). The user can also utilize mobile device 106 to command bot service 108 to find the calendar of another user in network system, 100 and schedule an appointment with that other user by inserting an appointment at an available time. The user can also command bot service 108 to gather public information available in the network system 100 (e.g., email addresses and information about other users) and provide that information to the user at mobile device 106.

According to an embodiment of the invention, the user may be using one or more mobile devices 106 once a registration process is completed for each device. The registration interactive 116 provides users with a way to setup a communication link between one or more mobile devices 106 and server 104. For example, server 104 or any other server connected to network system 100 may comprises a registration interface 116 (e.g., an HTML based registration web page) for a user to interact with the web interface using, for example, a web browser. For each mobile device 106, the user may utilize registration interface 116 to provide information to server 104 via registration interface 116. In other embodiments of the invention, the user may register a mobile device by submitting information via email or any other mechanism for communicating the registration information to the system. The information provided by the user during registration comprises user profile information and mobile device 106 information. User profile information may comprise, for example, user identification information, a user's mail/message server information at server 104, email account address and password of the user for the mail server, etc. Mobile device information may comprise one of several types recognized by bot service 108, and the email address for mobile device 106. Bot service 108 can maintain the user profile and mobile device information in database 110.

EXAMPLE OPERATION

An example operation scenario in which an employee of a corporation utilizes email enabled mobile devices 106 to manage information (e.g., user's message/mail queue and calendar information) on a server 104, is now described.

The user first registers mobile device 106 with bot service 108 by using registration interface 116 (e.g. via a browser running on a personal computer). Using registration interface 116, the user utilizes an "Add User as a Bot User" selection to register with bot service 108. After providing personal profile information, mail server and calendar server information the user can register one or more mobile devices 106 for access to the user's messages 112 and/or calendar 114.

In an embodiment of the invention, the user chooses a mobile device type from a pull down list of several mobile devices 106 at registration interface 116, then enters the email address associated with that mobile device 106. The user then presses an "Add New Device" button. The user profile and mobile device information may be maintained in database 110 which resides in server 102 or server 104.

To modify the user profile, such as to add/delete a mobile device, or if the user moves to a different mail or calendar server, the user can edit the user's bot user profile via registration interface 116. After the user enters an employee ID, or some other type of unique identifier, the user can modify any aspect of his user profile or mobile device information. For security purposes, the user may be asked to enter a current login password before any changes are saved to the database 110. After registration, the user can establish an email communication link between mobile device 106 and server 104, to send bot service 108 command messages as described above.

The following descriptions provides examples of how different mobile devices 106 (e.g., PalmPilot, PageWriter 2000, AccessLink II, BellSouth IPS pager, Pac Bell GSM Phone) may be connected to the system so that the user can use such devices to manage data in server 104.

Bot Service Usage

Figure 4:
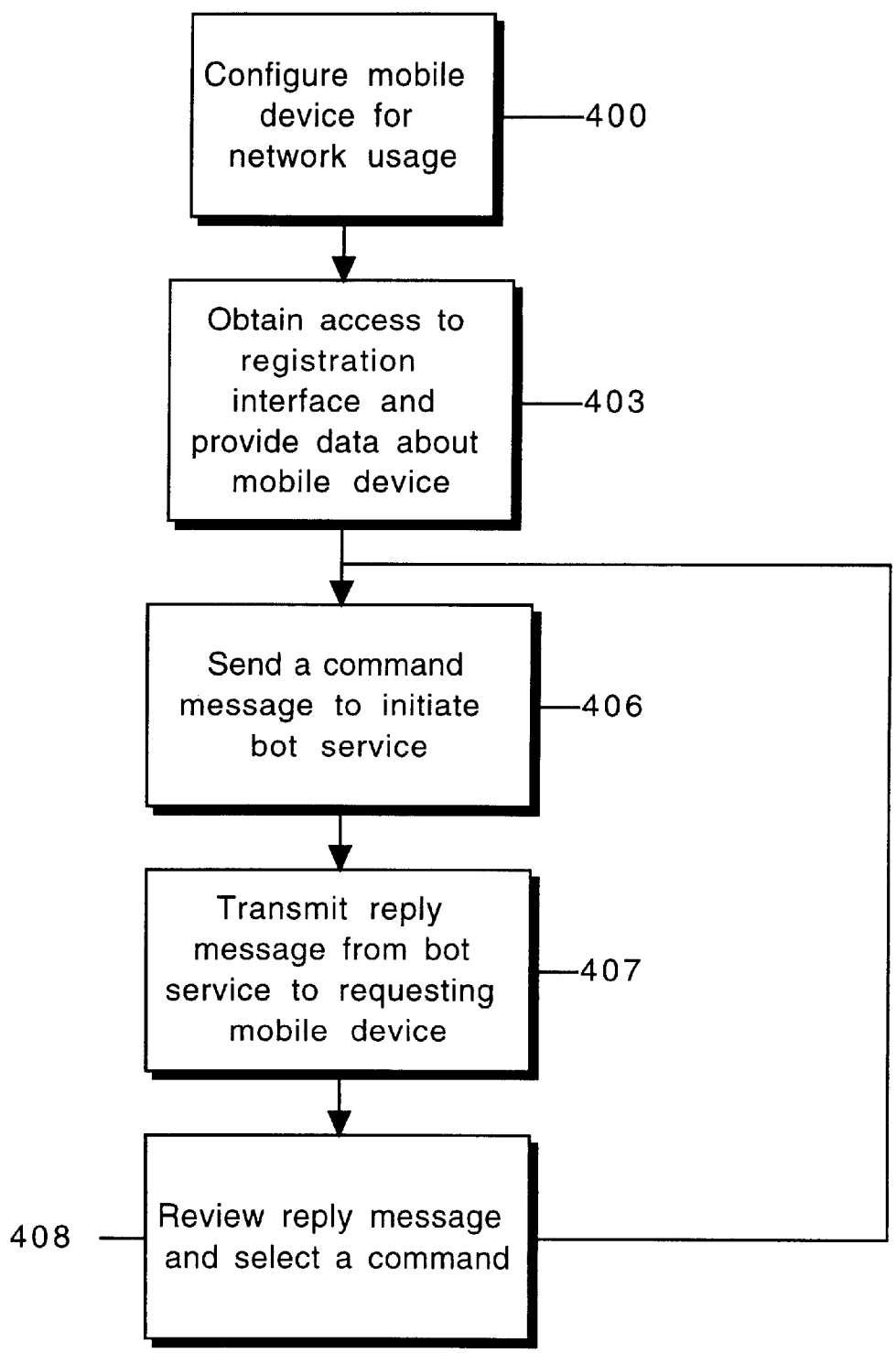
FIG. 4 illustrates an example of the process utilized in one embodiment of the invention to configure a mobile device for usage with the system.

Referring now to FIG. 4, an example of the process utilized in one embodiment of the invention to configure a mobile device for usage with the system is shown. At step 400, the user configures the mobile device (e.g. a Palm Pilot or other such portable computer) for usage with network.

For example, this step may comprise configuring a modem or other mechanism for connecting to the interconnection fabric. At step 403, the user obtains access to registration interface and inputs the email address associated with the mobile device. At step 406, the user initiates the bot service by transmitting a command message (e.g. an email message) to an electronic address associated with server (e.g. bot@company.com). The body of the command message contains a command such as: sendheaders: nn, where nn is an optional number of headers the user would like to have retrieved from the server by bot. By default a certain number of headers may be retrieved (e.g. 10). At step 407, server 104 transmits a response message to the mobile device. At step 408, the user may interact with the reply message. The reply message may comprise a menu of command alternatives. The reply message sent from the bot service to the mobile device in response to the command message may, for example appear as follows:

[ ]Cal View: -d today -v day

[ ]Cal Mod: add -d today -s hh:mm pm -e hh:mm pm -t desc

[ ]Name:x

[ ]Delete Mail:nn

[ ]Move Folder:n n fldr

[ ]Mail: to: X Subject: X

--end sendmail--

Mail Hdrs@11:53 AM:

1 Jake Smyth 2k
 Testing the Bot

2 Jake Smyth 1k
 Wow, the Bot is cool!To retrieve individual messages from the header listing, the user may place a "-" character in front of the message number(s). For example, to retrieve message 1 above and reply to the headers/menu email the user may modify the message body to look as follows:

Mail Hdrs@11:53 AM:

s-1 Jake Smyth 2k
 Testing the Bot

2 Jake Smyth 1k
 Wow, the Bot is cool!Once the user retrieves a message, the user can perform a variety of operations on it, by using the mini-menu included at the top of the message to initiate additional command messages. (e.g. at step 408) Once the command is selected, step 406 may re-execute and the command is transmitted to the bot service. A typical message retrieved might, for example, appear as follows:

Frm: Jake Smyth 2k
 Testing the Bot

To: jake.smyth

Cc: bots

[ ]reply to sender—msg 1:

--end reply to sender--

[ ]reply to ALL—msg 1:

--end reply to ALL--

[ ]fwd to [ ]—msg 1:

--end fwd--

This is a test of the Bot!!!

By placing an "x" in one of the options in the menu, and filling in the necessary body of the reply (above the "end" line), the user can send that email off to bot service 108, (and thereby submits an additional command message). The user may also reply or forward text, and insert a copy of the user's original message, before sending it on to the recipient. Note that in one embodiment of the invention, a valid email address or addresses may be placed in the second set of brackets on the "[ ] fwd to [ ]" line shown above if the user wishes to use this option.

If the user wishes to retrieve a copy of today's calendar entries from the user's calendar residing on server 104, the user may do so by responding to the menu email and placing an "x" between the brackets next to a "Cal View" line. The user can also specify an alternate date (mm/dd/yy), as well as request "day", week or "month" views using the -v flag. If the user has assigned the correct permissions to the user's calendar, the user can add a new calendar entry using the "Cal Mod" option shown above.

The user can also lookup names from a company names list database by using a "Name" option provided. By default the, output is in a short format. If the user would like more detailed output, the user may precede the name the user is looking for with a "+". For example:

[x]Name:+jake.smyth*

Note that wildcards ("*") are supported for searching for partial names. The user may delete email (moved to a folder named "Trash" in the user's mail folder directory), or move one or more messages to a folder using the appropriate options in the menu.

The last line of the menu allows the user to initiate email from the user's mobile device. After filling in the "to" and "subject" lines, the user may enter the user's message, making sure to keep it above the "--end sendmail--" delimiter. Note that email sent this way is resent from within the company having the user's email account-thereby hiding the address of the user's mobile device from the message recipient. This is important, because it allows the user to have a single mail queue to manage, not a different mail queue for each mobile device.

In general, the user can perform multiple operations within the same reply to the bot service (such as name lookup, and mail message retrievals). However, in one embodiment of the invention, the "Move Folder" and "Delete Mail" operations are initiated as a single request since they affect the state of the user's mail queue. If the user attempts to perform other operations in association with the move and/or delete operation the operations will be ignored.

Figure 5:
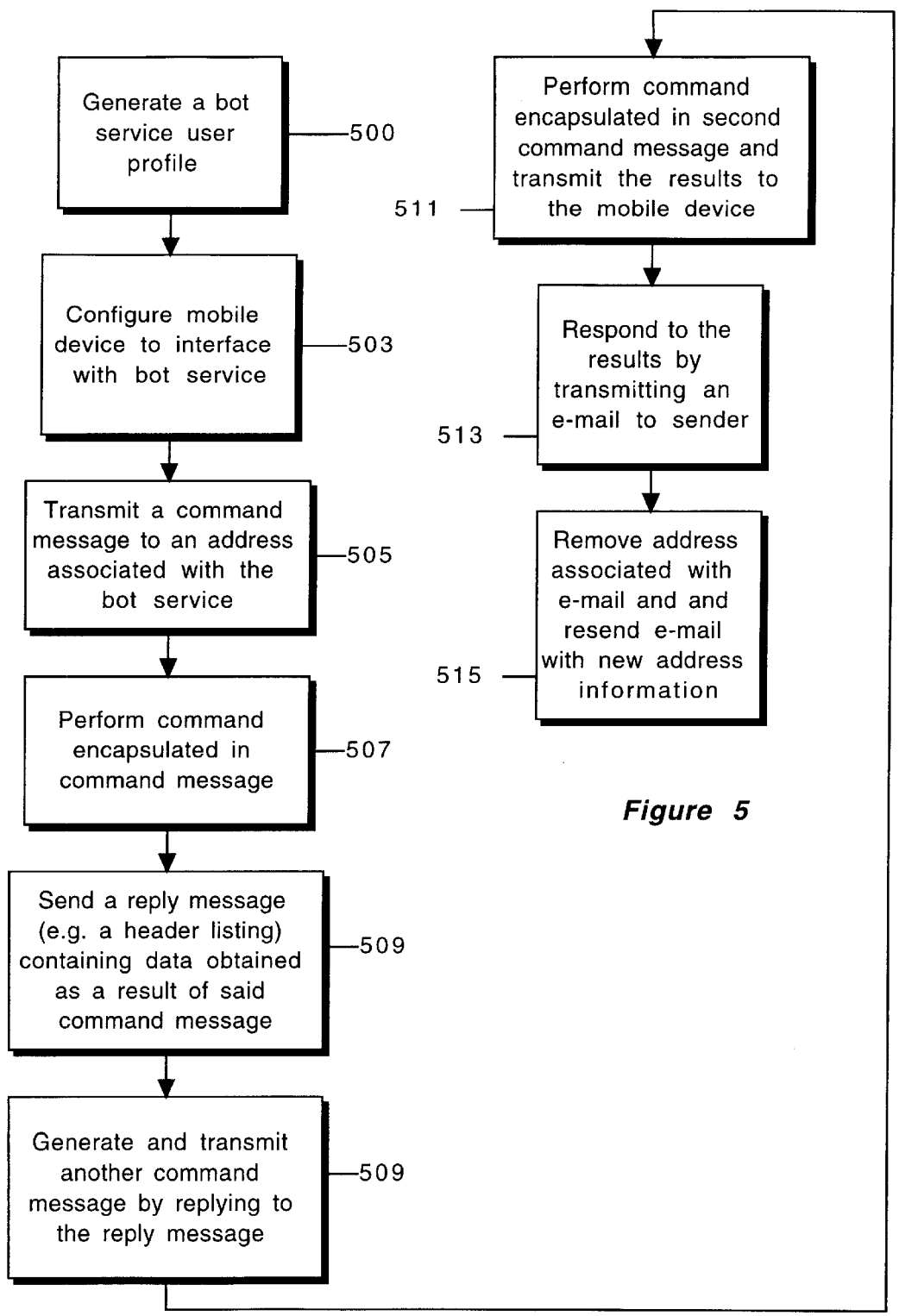
FIG. 5 is a flow diagram showing the process utilized by one embodiment of the invention to manage information on a server from a mobile devices such as a pager.

Bot Service Usage:

The process utilized, by one embodiment of the invention, to interact with a mobile device (e.g.a PageWriter 2000) is discussed below. Referring now to FIG. 5, a flow diagram showing the process utilized by one embodiment of the invention to manage information on a server from a pager is shown. At step 500, a bot user profile is generated. For example, the user may add an email address associated with the pager to the user's bot profile. Other information such as the user's name may also be specified a this step. The user may, for example use a browser to interact with a user interface that provides a way to modify and/or update the user's bot profile. At step 503, the mobile device is configured to interface with the bot service. The user may, for example, setup the pager device's "quicktext" feature with the strings listed below. This will help the user reduce typing and provide the user with a predetermined set of command messages which the user may utilize to interact with the bot service.

cal mod: add -d today -s hh:mm pm -e
 hh:mm pm -t desc send cal: -d today -v week
send headers:
delete mail: n n
move folder: n n fldr
fetch mail; n n n
forward mail; addr n bod
reply mail; n bod
reply all mail; n bod
send mail; To: Sub; Bod;
send name; xx An electronic mail interface or other mechanism for sending data to the bot service is also configured at this step. At step 505, the user transmits the command message to an address associated with the bot service. In one embodiment of the invention, sending a command message to an address associated with the bot service initiates the bot service. The user may transmit a command message by, for example, sending an email to the email address associated with the bot service and/or the server comprising the message data to be managed (e.g. bot@company.com). The body of the email may contain, for example the following command message:

send header: nn

Where "nn" is an optional number of headers the user would like the bot to retrieve for the user. At step 507, the command encapsulated in the command message is performed. If the command message requests that headers be sent, the bot service will obtain the data necessary to retrieve the requested commands. By default, user's last 10 headers are retrieved. In some instances, mobile devices (e.g. pagers such as the PageWriter 2000) have a character per message limit (e.g.450), therefore, requesting more than 10 headers might possibly cause the return email listing the user's headers to be truncated.

At step 509, the bot service and/or the server, for example, may send a reply message containing the data obtained as a result of the command message. An embodiment of the invention sends a reply message comprising a header listing back to the user. The user may interact with the header listing which comprises the email sent from the bot to the user's pager in response to the command message sent by the user in step 505. In one embodiment of the invention, the header listing appears as follows:

bot@company.com Hdrs]
1 Jake Smyth 10K
Testing the Bot
2 Jake Smyth 1K
Wow, the Bot is cool!

To retrieve one or more of these messages, the user may reply to the header listing. This generates another command message and causes step 511 to execute. For example, in one embodiment of the invention, replying to the header listing lists out the message numbers the user would like sent to the user's pager. For example, if the user wants both messages shown above, the user may simply reply to the email with: 12. For mobile devices that have a 450 character per message limitation, (such as the PageWriter), the invention contemplates the use of a split utility which may be built into the bot service. For example, to retrieve the first three "chunks" of message 1 above, the user may reply to the header listing with: "I 1-2 1-3". This causes the bot to retrieve the first three 450 character sections of message I, and forward them to the user's pager. In general, replying to the reply message (e.g. the header listing) causes the invention to perform the command encapsulated in the second command message and transmits the results to the mobile device (e.g. step 511).

Once the user receives the results, which may be sent in email form, step 513 executes and the user may respond to the results by transmitting and email to the sender. For example, the user my reply to the sender by using the "reply mail: n bod" or to everyone on the original distribution list by using "replyall mail:n bod", where "n" represents the message number the user are replying to. A copy of the original message may be included in the user's reply automatically.

If the user want to retrieve a copy of today's calendar entries from the user's calendar, the user may use the "send cal:.." command entry mentioned in step 503 to compose a new message to bot@sun.com with the command included, then send it off. The user can also specify an alternate date (mm/dd/yy), as well as request "day", "week" or "month" views using the -v flag. If the user has assigned the correct permissions level to the user's calendar, the user may add a new calendar entry using the "cal mod:..." option. The user may lookup names from a company names list database by using the "send name;" command. By default, output is in "short" format. If the user would like more detailed output, the user may precede the name the user is looking for with a "+". For example:

[x]Name:+jake.smyth*

Note that wildcards ("*") are supported for searching for partial names.

The user may also delete email (moved to a folder named "Trash" in the user's mail folder directory), or move one or more messages to a folder using the appropriate quicktext command strings listed above. To initiate an email from a mobile device such as the PageWriter, the user may use the quicktext option to generate a command such as "send mail:To:Sub:Bod:" When the user sends email, step 515 executes and the address information associated with the mobile device sending the email is removed and replaced with the new address information associated with the user's email account on the server. Address information associated with the bot service may also be placed in such email messages. Thus, email sent by the user is resent from within the company having the server computer, using the user's company email address-thereby hiding the address of the user's mobile device from the message recipient. This is important, because it allows the user to have a single mail queue to manage, not a different mail queue for each mobile device.

EXAMPLE SERVER ARCHITECTURE

Figure 3:
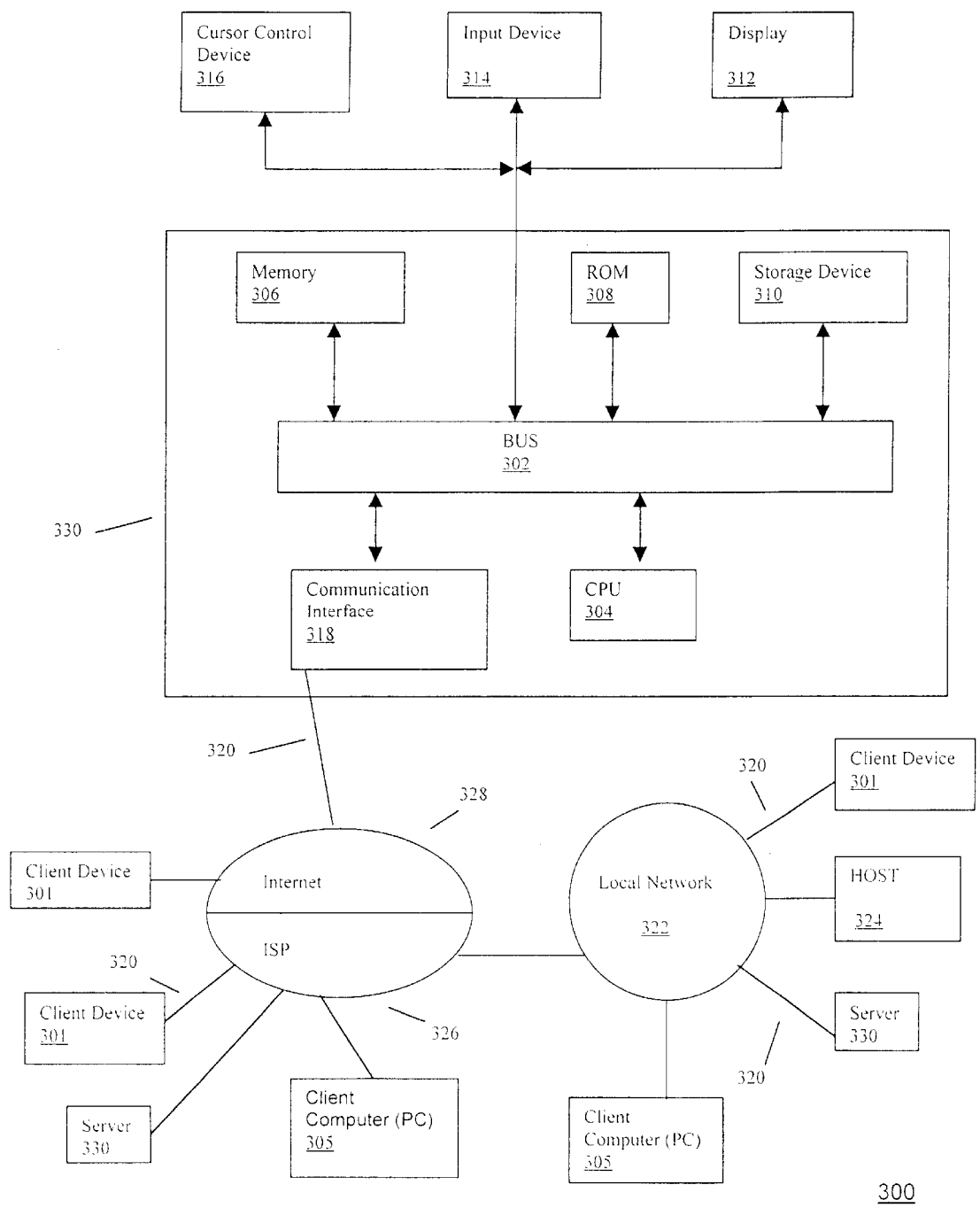
FIG. 3 shows a block diagram of a computer system capable of providing a suitable execution environment for the server as described in one or more embodiments of the invention.

FIG. 3 shows a block diagram of an example architecture of an embodiment of a network system 300 in which the present invention can be implemented. The network system 300 includes one or more email capable mobile devices 301 (e.g., mobile device 106 in FIG. 1) connected to one or more email capable server computing systems 330 (e.g., server 104 in FIG. 1). A server 330 includes a bus 302 or other communication mechanism for communicating information, and a processor (CPU) 304 coupled with the bus 302 for processing information. The server 330 also includes a main memory 306, such as a random access memory (RAM) or other dynamic storage device, coupled to the bus 302 for storing information add instructions to be executed by the processor 304. The main memory 306 also may be used for storing temporary variables or other intermediate information during execution or instructions to be executed by the processor 304. The server computer system 330 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions (e.g., the storage device 310 can store the data base 110, messages 112, calendar 114, program code and data for the user interface code 116, program code and data for bot service 108, etc.). The bus 302 may contain, for example, thirty-two address lines for addressing video memory or main memory 306. The bus 302 can also include, for example, a 32-bit data bus for transferring data between and among the components, such as the CPU 304, the main memory 306, video memory and the storage 310. Alternatively, multiplex data/address lines may be used instead of separate data and address lines.

In one embodiment, the CPU 304 comprises a microprocessor manufactured by Motorola(R), such as the 680x0 processor, or a microprocessor manufactured by Intel(R), such as the 80X86, or Pentium(R) processor, or a SPARC(R) microprocessor from Sun Microsystems(R). However, any other suitable microprocessor or microcomputer may be utilized. The main memory 306 can comprise dynamic random access memory (DRAM). And video memory (not shown) can comprise a dual-ported video random access memory.

The server 330 may be coupled via the bus 302 to a display 312, such as a cathode ray tube (CRT), for displaying information to a computer user. An input device 314, including alphanumeric and other keys, is coupled to the bus 302 for communicating information and command selections to the processor 304. Another type or user input device comprises cursor control 316, such as a mousse, a trackball, or cursor direction keys for communicating direction information and command selections to the processor 304 and for controlling cursor movement on the display 312. This input device typically has two degrees of freedom in two axes, a first axis (e.g., x) and a second axis (e.g., y) that allows the device to specify positions in a plane.

According to one embodiment of the invention, the steps of bot service 108 are performed by the server 330 in response to the processor 304 executing one or more sequences of one or more instructions contained in the main memory 306. Such instructions may be read into the main memory 306 from another computer-readable medium, such as the storage device 310. Execution of the sequences of instructions contained in the main memory 306 causes the processor 304 to perform the process steps described herein. One or more processors in a multi-processing arrangement may also be employed to execute the sequences of instructions contained in the main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participated in providing instructions to the processor 304 for execution. Such a medium may take may forms, including but not limited to, non-volatile media, volatile media, and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the server 330 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 106, from which the processor 304 retrieves and executes the instructions. The instructions received from the main memory 306 may optionally be stored on the storage device 310 either before or after execution by the processor 304.

The server 330 also includes a communication interface 318 coupled to the bus 302. The communication interface 318 provides a two-way data communication coupling to a network link 320 that is connected to the world wide packet data communication network now commonly referred to as the Internet 328. The Internet 328 uses electrical, electromagnetic or optical signals that carry digital data streams. The signals through the various networks and the signals on the network link 320 and through the communication interface 318, which carry the digital data to and from the server 330, are exemplary forms or carrier waves transporting the information.

In another embodiment of the server 330, interface 318 is connected to a local network 322 via a communication link 320. For example, the communication interface 318 may be an integrated services digital network (ISDN) card or a modem to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information.

The network link 320 typically provides data communication through one or more networks to other data devices. For example, the network link 320 may provide a connection through the local network 322 to a host computer 324 or to data equipment operated by an Internet Service Provider (ISP) 326. The ISP 326 in turn provides data communication services through the Internet 328. The local network 322 and the Internet 328 both use electrical, electromagnetic or optical signals that carry digital data streams. The signals through the various networks and the signals on the network link 320 and through the communication interface 318, which carry the digital data to and from the server 330, are exemplary forms or carrier waves transporting the information.

The server 330 can send/receive messages and data, including email, program code, through the network, the network link 320 and the communication interface 318. Further, the communication interface 318 can comprise a USB/Tuner and the network link 320 may be an antenna or cable for connecting the server 330 to a cable provider, satellite provider or other terrestrial transmission system for receiving messages, data and program code from another source.

The example versions of the invention described herein are implemented as logical operations in a distributed processing system such as the network system 300 including the servers 330. The logical operations of the present invention can be implemented as a sequence of steps executing in the server 330, and as interconnected machine modules within the network 300. The implementation is a matter of choice and can depend on performance of the network 300 implementing the invention. As such, the logical operations constituting said example versions of the invention are referred to for e.g. as operations, steps or modules.

Similar to a server 330 described above, an email capable mobile device 301 can include a processor, memory, storage device, display, input device and communication interface (e.g., email interface) for connecting mobile device to the Internet 328, the ISP 326, or LAN 322, for communication with the severs 330.

The network system 300 can further include more email capable computers (e.g., personal computers) 305 operating the same manner as email capable mobile devices 301, wherein a user can utilize one or more computers 305 to manage data in the server 330 using bot service 108 therein.

Thus, a method and apparatus for remotely managing data via a mobile device is described in conjunction with one or more specific embodiments. Although various example embodiments have been described, it will be understood that the invention is not limited to these described examples. The invention is defined by the claims and their full scope of equivalents.

What is claimed is:

1. A system for remotely managing information comprising:
    means for obtaining a command message from a mobile device, said command message comprising an action to be performed on data;
    means for deriving a result by performing said action on said data on behalf of said mobile device;
    means for obtaining a mobile address, said mobile address being associated with said mobile device;
    means for transmitting said result to said mobile address in response to said command message;
    means for generating a response to said result, at said mobile device, by formulating an electronic mail message, said electronic mail message having said mobile address;
    means for transmitting said electronic mail message to an intermediary;
    means for removing said mobile address;
    attaching a server address to said electronic message.

2. The system of claim 1 wherein said address associated with said mobile device resides on a server computer.

3. The system of claim 1 wherein said command message is transmitted to a bot address, said bot address being associated with a bot service.

4. A method for remotely managing information comprising:
    obtaining a command message from a mobile device, said command message comprising an action to be performed on data;
    deriving a result by performing said action on said data on behalf of said mobile device;
    obtaining a mobile address, said mobile address being associated with said mobile device;
    transmitting said result to said mobile address in response to said command message;
    generating a response to said result, at said mobile device, by formulating an electronic mail message, said electronic mail message having said mobile address;
    transmitting said electronic mail message to an intermediary;
    removing said mobile address;
    attaching a server address to said electronic mail messages.

5. The method of claim 4 wherein said result comprises a reply message, said reply message comprising a list of command alternatives associated with said result.

6. The method of claim 4 wherein said address associated with said mobile device resides on a server computer.

7. The method of claim 4 wherein said command message is transmitted to a bot address, said bot address being associated with a bot service.

8. A computer program product comprising:
    a computer readable medium having a computer program product for remotely managing information embodied therein, said computer program product configured to:
        obtain a command message from a mobile device, said command message comprising an action to be performed on data;
        derive a result by performing said action on said data on behalf of said mobile device;
        obtain a mobile address, said mobile address being associated with said mobile device;
        transmit said result to said mobile address in response to said command message;
        generate a response to said result, at said mobile device, by formulating an electronic mail message, said electronic mail message having said mobile address;
        transmit said electronic mail message to an intermediary;
        remove said mobile address;
        attach a server address to said electronic mail message.

9. The computer program product of claim 8 wherein said address associated with said mobile device resides on a server computer.

10. The computer program product of claim 8 wherein said command message is transmitted to a bot address, said bot address being associated with a bot service.

11. An apparatus for remotely managing information comprising:
    a processor;
    a memory medium coupled to said processor;
    a computer program product executing in said memory medium, embodied therein, said computer program product configured to:
        obtain a command message from a mobile device, said command message comprising an action to be performed on data;
        derive a result by performing said action on said data on behalf of said mobile device;

obtain a mobile address, said mobile address being associated with said mobile device;

transmit said result to said mobile address in response to said command message;

generate a response to said result, at said mobile device, by formulating an electronic mail message, said electronic mail message having said mobile address;

transmit said electronic mail message to an intermediary;

remove said mobile address;

attach a server address to said electronic mail message.

12. The apparatus of claim 11 wherein said address associated with said mobile device resides on a server computer.

13. The apparatus of claim 11 wherein said command message is transmitted to a bot address, said bot address being associated with a bot service.

* * * * *